us009818199B2

(12) United States Patent
Seifi et al.

(10) Patent No.: US 9,818,199 B2
(45) Date of Patent: Nov. 14, 2017

(54) METHOD AND APPARATUS FOR ESTIMATING DEPTH OF FOCUSED PLENOPTIC DATA

(71) Applicant: THOMSON LICENSING, Issy les Moulineaux (FR)

(72) Inventors: Mozhdeh Seifi, Thorigne-Fouillard (FR); Neus Sabater, Betton (FR); Valter Drazic, Betton (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 32 days.

(21) Appl. No.: 14/953,006

(22) Filed: Nov. 26, 2015

(65) Prior Publication Data
US 2016/0148386 A1 May 26, 2016

(30) Foreign Application Priority Data
Nov. 26, 2014 (EP) .................................... 14306888

(51) Int. Cl.
*G06T 7/557* (2017.01)
*G06T 7/90* (2017.01)
(Continued)

(52) U.S. Cl.
CPC .......... *G06T 7/0065* (2013.01); *G06K 9/4652* (2013.01); *G06K 9/52* (2013.01); *G06T 7/557* (2017.01); *G06T 7/60* (2013.01); *G06T 7/90* (2017.01); *H04N 5/23229* (2013.01); *H04N 9/79* (2013.01); *G06T 2207/10052* (2013.01); *G06T 2207/20228* (2013.01)

(58) Field of Classification Search
CPC ........ G06T 7/557; G06T 7/90; H04N 5/23229
See application file for complete search history.

(56) References Cited

U.S. PATENT DOCUMENTS

| 2012/0242855 A1 | 9/2012 | Nagasaka et al. |
| 2013/0120356 A1* | 5/2013 | Georgiev .............. G06T 15/205 345/419 |
| 2013/0120605 A1 | 5/2013 | Georgiev et al. |

OTHER PUBLICATIONS

Changil Kim et al: "Scene reconstruction from high spatio-angular resolution light fields", ACM Transactions on Graphics, vol. 32, No. 4, Jul. 1, 2013 (Jul. 1, 2013), pp. 1-5.*

(Continued)

*Primary Examiner* — Christopher K Peterson
(74) *Attorney, Agent, or Firm* — Tutunjian & Bitetto, P.C.

(57) ABSTRACT

Method and apparatus for estimating the depth of focused plenoptic data are suggested. The method includes: estimating the inherent shift of in-focus pixels of the focused plenoptic data; calculating a level of homogeneity of the pixels of the focused plenoptic data; determining the pixels of the focused plenoptic data which either have disparities equal to the inherent shift or belong to homogeneous areas, as a function of the level of homogeneity of the pixels of the focused plenoptic data; and estimating the depth of the focused plenoptic data by a disparity estimation without considering the determined pixels. According to the disclosure, the pixels of the focused plenoptic data which either have a disparity equal to the inherent shift or belong to a homogeneous area will not be considered for the estimation of the depth, which can reduce computational costs and at the same time increase accuracy of estimations for in-focus parts of the scene.

14 Claims, 4 Drawing Sheets

(51) Int. Cl.
    H04N 5/232    (2006.01)
    H04N 9/79     (2006.01)
    G06K 9/52     (2006.01)
    G06K 9/46     (2006.01)
    G06T 7/60     (2017.01)
    G06T 7/00     (2017.01)

(56) References Cited

OTHER PUBLICATIONS

Kim etal.—"Scene Reconstruction from High Spatio-Angular Resolution Light Fields"—ACM Transactions on Graphics (TOG)—SIGGRAPH 2013 Conference Proceedings, vol. 32, Issue 4, Jul. 2013; pp. 1-11.
Tulyakov etal.—"Quadratic formulation of disparity estimation problem for light-field camera"—20th IEEE International Conference on Image Processing (ICIP)—Sep. 15-18, 2013; pp. 2063-2065.
Uliyar etal.—"Fast EPI based depth for plenoptic cameras"—20th IEEE International Conference on Image Processing (ICIP) 2013—Sep. 15-18, 2013' pp. 1-4.
Atanassov etal'—"Content-based depth estimation in focused plenoptic camera"—Proceedings of the SPIE—The International Society for Optical Engineering—vol. 7864, Jan. 27, 2011; pp. 1-10.
Wanner etal.—"Variational light field analysis for disparity estimation and super-resolution"—IEEE Transactions on Pattern Analysis & Machine Intelligence, vol. 36, Issue No. 03, Mar. 2014; pp. 606-619.
Lumsdaine etal.—"The focused plenoptic camera"—IEEE International Conference on Computational Photography (ICCP), 2009—Apr. 16-17, 2009 ; pp. 1-8.
Sabater etal.—"Light field demultiplexing and disparity estimation"—https://hal.archives-ouvertes.fr/hal-00925652—Jan. 9, 2014; pp. 1-12.
Perwass etal.—"Single lens 3D Camera with extended depth of field"—Proc. SPIE 8291, Human Vision and Electronic Imaging XVII, 829108 (Feb. 9, 2012)—http://www.raytrix.de/; pp. 1-15.
Steffens et al: "Probabilistic Scene Analysis for Robust Stereo Correspondence" , Jul. 6, 2009 (Jul. 6, 2009), Image Analysis and Recognition, pp. 697-706.
Search Report dated May 28, 2015.

* cited by examiner

METHOD AND APPARATUS FOR ESTIMATING DEPTH OF FOCUSED PLENOPTIC DATA

This application claims the benefit, under 35 U.S.C. §119 of European Patent Application No. 14306888.0, filed Nov. 26, 2014.

TECHNICAL FIELD

The present disclosure relates to the technology of light field, and in particular to a method and an apparatus for estimating the depth of focused plenoptic data.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

A light field is a concept proposed in the computer graphics and vision technology, which is defined as all the light rays at every point in space travelling in every direction. A light-field camera, also called a plenoptic camera, is a type of camera that uses a microlens array to capture 4D (four-dimensional) light field information about a scene because every point in the three-dimensional space is also attributed a direction. A light field cameras has microlens arrays just in front of the imaging sensor, which may consist of many microscopic lenses with tiny focal lengths and split up what would have become a 2D-pixel (length and width) into individual light rays just before reaching the sensor. This is different from a conventional camera which only uses the two available dimensions of the film/sensor. The resulting raw image captured by a plenoptic camera is a composition of many tiny images since there are microlenses.

A plenoptic camera can capture the light field information of a scene. The light field information then can be post-processed to reconstruct images of the scene from different point of views after these images have been taken. It also permits a user to change the focus point of the images. As described above, compared to a conventional camera, a plenoptic camera contains extra optical components to achieve the mentioned goal.

The plenoptic data captured by an unfocused plenoptic camera are known as the unfocused (type 1) plenoptic data, and those captured by a focused plenoptic camera are known as the focused (type 2) plenoptic data.

One exemplary algorithm for estimating the disparities of the the unfocused (type 1) plenoptic data based on block-matching was discussed in the reference written by N. Sabater, V. Drazic, M. Seifi, G. Sandri, and P. Perez, "Light field demultiplexing and disparity estimation," HAL, 2014 (hereinafter referred to as reference 1).

In the type 2 plenoptic camera, the distance between the micro-lens and the sensor is different from the focal length of the microlenses. This configuration sacrifices the achievable angular resolution by the plenoptic type 1 configuration, for better spatial resolution.

Having several aligned views of the scene, one intuitive application of the plenoptic data is to estimate depth of the scene. Known solutions of depth estimation are usually performed by estimating the disparity of pixels between the views. Generally, the disparity d of a pixel (x,y) of a view $l_{i,j}$ with respect to another view $l_{k,j}$ is estimated as the displacement of this pixel on the view $l_{k,j}$. The known estimating methods are usually time consuming and not very accurate on non-textured areas. The block-matching method—as described in the reference 1—also suffers from low accuracy around edges in the scene and the results are degraded by foreground fattening effect.

One exemplary algorithm is discussed in the reference written by S. Wanner and B. Goldleuke, "Variational light field analysis for disparity estimation and super-resolution", IEEE transaction of pattern analysis and machine intelligence, 2013 (hereinafter referred to as reference 1). In the reference 1, structure tensors (gradients) are calculated to decide which pixels will be used for estimating the disparities. However, this algorithm requires many calculations of eigenvalue decompositions on small images.

SUMMARY

The present disclosure addressed at least some of the above mentioned shortcomings. The present disclosure will be described in detail with reference to exemplary embodiments. However, the present disclosure is not limited to the embodiments.

According to a first aspect of the present disclosure, there is provided a method for estimating the depth of focused plenoptic data. The method includes: estimating an inherent shift of in-focus pixels of the focused plenoptic data comprising a constant shift between samples of a same point on different microlens images of the focused plenoptic data; determining a level of homogeneity of pixels of the focused plenoptic data; determining pixels of the focused plenoptic data which either have disparities equal to the inherent shift or belong to homogeneous areas, as a function of the level of homogeneity of the pixels of the focused plenoptic data; and estimating a depth of the focused plenoptic data by a disparity estimation without considering the determined pixels.

In an embodiment, the inherent shift can be estimated as a function of a distance between a microlens grid of a camera capturing the focused plenoptic data and an in-focus plane of a main lens of the camera, an aperture and a focal length of microlens of the camera.

In an embodiment, estimation of the inherent shift can comprise estimating a shift between samples of a same point on different views of the focused plenoptic data.

In an embodiment, the inherent shift can be estimated as a function of an aperture of microlens of a camera capturing the focused plenoptic data.

In an embodiment, the level of the homogeneity of each pixel can be determined by estimating a measure of homogeneity among all of its corresponding pixels, and assigning the estimated metric to all of the corresponding pixels (creating a homogeneity image).

In an embodiment, the level of the homogeneity of each pixel can be determined by calculating standard deviations among all of its corresponding pixels on three color channels, and assigning the estimated metric to all of the corresponding pixels. In the embodiment, a homogeneity image is created.

In an embodiment, the level of the homogeneity of each pixel can be determined from a matrix of views of the focused plenoptic data to represent the light field of the views, by calculating a measure of homogeneity (for example standard deviation) of the corresponding pixels of each pixel on the plurality of views in the matrix of views on three color channels.

In an embodiment, the corresponding pixels for a pixel at spatial coordinates (x,y) on the raw data can be determined determined by; denoting the inherent shift by disp1, for a pixel at the spatial coordinate (u,v) in a microlens image at (x,y) on the raw data, the corresponding pixel in another microlens image at (x',y') on the raw data is found at the spatial position (u+(x'-x) disp1,v+(y'-v) disp1).

In an embodiment, the matrix of view can be determined by: estimating from the focused plenoptic data a position of a center of each micro-lens of a plenoptic camera capturing the unfocused plenoptic data; and demultiplexing for all angular coordinates (u,v) the corresponding view (u,v) of the unfocused plenoptic data by extracting from every microlens image the pixel at the spatial coordinate (u,v) with respect to the center of every micro-lens image, and putting the extracted pixel in the view considering the inherent shift.

In an embodiment, the level of the homogeneity of each pixel can be determined by estimating a measure of homogeneity considering the corresponding pixels for each pixel in the matrix of views, and assigning the estimated metric to all of the pixels of the corresponding pixels for each microlens image. In the embodiment, a matrix of metric views is creating.

In an embodiment, the determination of the in-focus pixels of the focused plenoptic data can be obtained from the level of the homogeneity among the corresponding pixels that are obtained by considering the inherent shift. Denoting the inherent shift by disp1, for a pixel at the spatial coordinate (u,v) in a microlens image at (x,y) on the raw data, the corresponding pixel in another microlens image at (x',y') on the raw data is found at the spatial position (u+(x'-x) disp1,v+(y'-v) disp1). In one embodiment, the level of homogeneity can be determined by calculating standard deviations of the corresponding pixels separately on each color channel. The corresponding pixels share the estimated homogeneity metric (e.g., the standard deviation). Assigning the estimated homogeneity metric value to all of the corresponding pixels determines a homogeneity image. Another example is to consider the DCT transform of the corresponding pixels, and sum of the energy of the signal in the high frequency band gives one measure of homogeneity.

In an embodiment, the determination of the in-focus pixels of the focused plenoptic data can further comprise thresholding the obtained homogeneity image of the focused plenoptic data to generate a binary mask showing which pixel has a disparity equal to the inherent shift or belong to a homogeneous area which has the same intensity for the corresponding pixels.

In an embodiment, the binary mask can comprise: setting a threshold on the standard deviation for each color channel of an in-focus pixel; comparing a color value of each color channel of the in-focus pixel in the homogeneity image with the threshold; and outputting a value of 0 if the color value of the each color channel is less than the threshold, and outputting a value of 1 otherwise.

According to a second aspect of the present disclosure, there is provided an apparatus for estimating the depth of focused plenoptic data. The apparatus includes: a first estimating unit configured to estimate an inherent shift of in-focus pixels of the focused plenoptic data, the inherent shift data comprising a constant shift between samples of a same point on different microlens images of the focused plenoptic data; a first determining unit configured to determine a level of homogeneity of pixels of the focused plenoptic data; a second determining unit configured to determine the pixels of the focused plenoptic data which either have disparities equal to the inherent shift or belong to homogeneous areas, as a function of the level of homogeneity of the pixels of the focused plenoptic data; and a second estimating unit configured to estimate a depth of the focused plenoptic data by a disparity estimation without considering the determined pixels.

In an embodiment, the first estimating unit can be configured to estimate the inherent shift by estimating a shift between samples of a same point on different microlens images of the focused plenoptic data.

In an embodiment, the first estimating unit can be configured to estimate the inherent shift as a function of the distance between the microlens grid of a camera capturing the focused plenoptic data and an in-focus plane of a main lens of the camera, an aperture and a focal length of microlens of the camera.

In an embodiment, the first estimating unit can be configured to estimate the inherent shift by estimating a shift between samples of a same point on the views of the focused plenoptic data.

In an embodiment, the first estimating unit can be configured to estimate the inherent shift as a function of an aperture of microlens of the camera capturing the focused plenoptic data.

In an embodiment, the first estimating unit can be configured to estimate the inherent shift as a function of an aperture of microlens of the camera capturing the focused plenoptic data.

In an embodiment, the second determining unit can be configured to determine the pixels of the focused plenoptic data which either have disparities equal to the inherent shift or belong to homogeneous areas by a thresholding the estimation homogeneity metric values which comprises: setting a threshold on the standard deviation for each color channel of an in-focus pixel; comparing the estimated homogeneity metric value per color channel with the threshold for that color channel; and outputting a value of 0 if the estimated homogeneity metric of the each color channel is less than the threshold, and outputting a value of 1 otherwise.

According to a third aspect of the present disclosure, there is provided a computer program comprising program code instructions executable by a processor for implementing the steps of a method according to the first aspect of the disclosure.

According to a fourth aspect of the present disclosure, there is provided a computer program product which is stored on a non-transitory computer readable medium and comprises program code instructions executable by a processor for implementing the steps of a method according to the first aspect of the disclosure.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF THE PREFERRED EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Firstly, in order to facilitate the understanding of the description to the embodiment of the disclosure, some information about the focused (type 2) plenoptic camera are provided hereinafter. For purpose of the illustration, the reference written by A. Lumsdaine, T. Georgiev, "The focused plenoptic camera", ICCP 2009 (hereinafter referred to as reference 2) is incorporated by reference.

Figure 1:
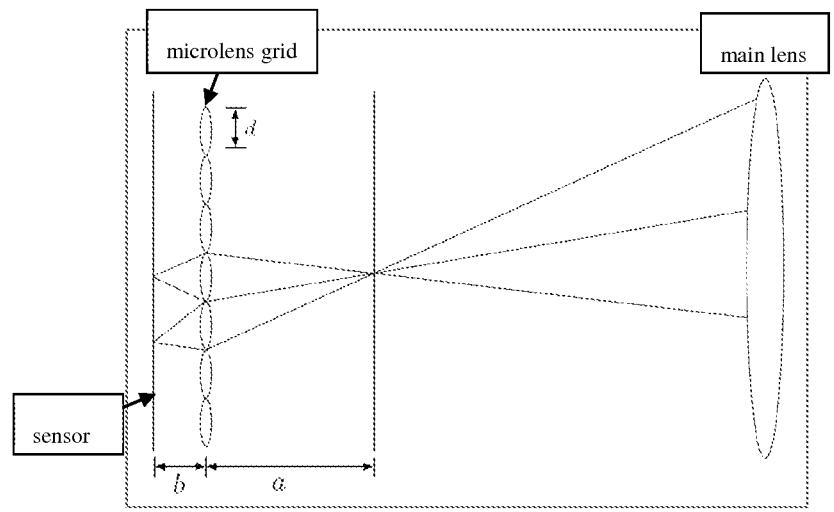
FIG. 1 illustrates light field sampling inside a type 2 plenoptic camera.

FIG. 1 illustrates light field sampling inside a type 2 plenoptic camera.

As shown in FIG. 1, in the type 2 plenoptic camera, a plane placed at distance a from the microlens grid is focused on the sensor placed at distance b from the microlens grid through the microlenses, such that the thin lens formula stands for a, b and the focal length of the microlenses f:

$$\frac{1}{f} = \frac{1}{a} + \frac{1}{b}.$$

Figure 2:
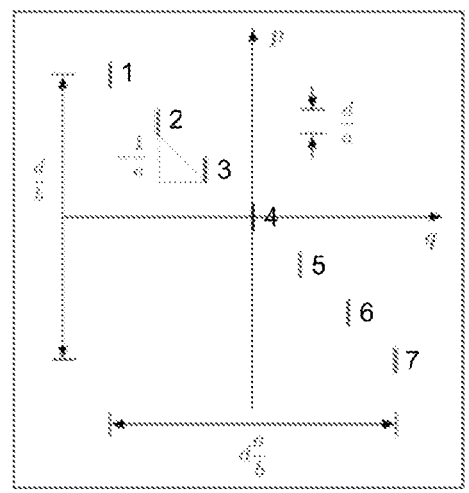
FIG. 2 illustrates phase-space diagram of one microlens image.

FIG. 2 illustrates phase-space diagram of one microlens image. In FIG. 2, numbers show local pixel indices under each microlens. A 2D phase-space diagram shows the sampling of the light field according to one spatial coordinate (denoted by q in FIG. 2) and one angular coordinate (denoted by p in FIG. 2). Besides, FIG. 2 shows the sampling of one microlens image of the in-focus plane.

Figure 3:
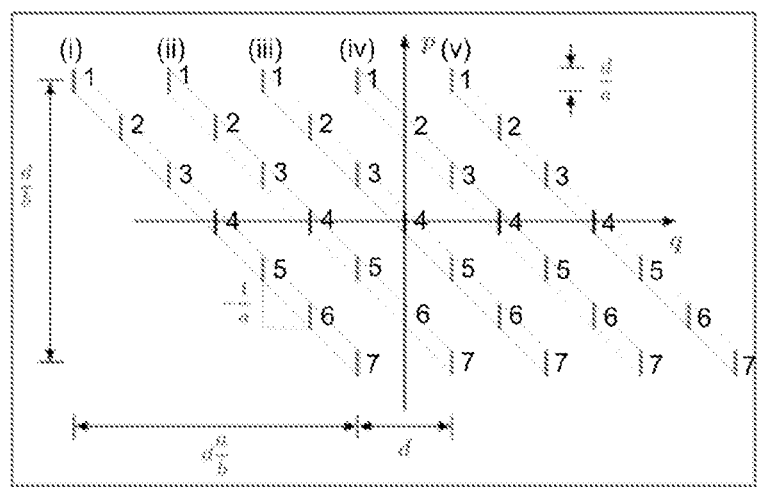
FIG. 3 illustrates phase-space diagram of 5 microlens images.

Considering several microlens images, the light field sampling for the in-focus plane at distance a is shown in FIG. 3. FIG. 3 illustrates phase-space diagram of 5 microlens images. In FIG. 3, numbers show local pixel indices under each microlens, and roman numbers show the microlens indices.

Figure 4:
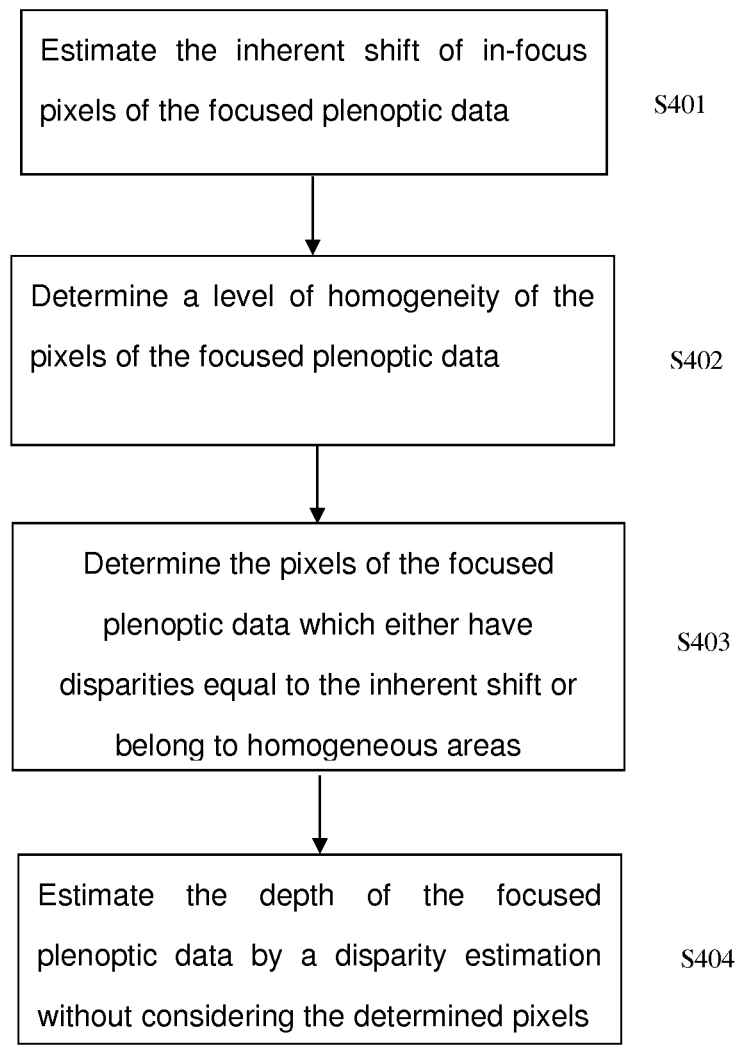
FIG. 4 is a flowchart of a method for estimating depth of focused plenoptic data according to an embodiment of the present disclosure.

FIG. 4 is a flowchart of a method for estimating depth of focused plenoptic data according to an embodiment of the present disclosure. The focused plenoptic data can be captured by a plenoptic camera shown with reference to FIGS. 1-3.

At step S401, the inherent shift of in-focus pixels of the focused plenoptic data is estimated the inherent shift comprising a constant shift between samples of a same point on different microlens images of the focused plenoptic data.

An in-focus pixel is a 3D point of the scene of the focused plenoptic data which is imaged in-focus by the main lens on a plane inside the camera. This in-focus plane is separated from the microlens grid by the distance a, as shown in FIG. 1. It can be appreciated that the in-focus pixels of the focused plenoptic data have a fixed amount of shift on the adjacent views if a demultiplexing method is used, which is called inherent shift in this disclosure.

Two known ways can be used to calculate disparities: (i) disparity calculation from the microlens images, where the inherent shift depends on the microlens aperture, the microlens focal lengths and the distance between the microlens grid and the sensor (Equation 2 below), and (ii) disparity calculation from the sub-aperture views, where the inherent shift is equal to microlens aperture. In this case, only the odd views or the even views possibly contain samples of the same point of the scene.

Thus, the inherent shift can be estimated between samples of a same point on either different microlens images or from the sub-aperture views of the focused plenoptic data.

In an example for both cases, it can firstly estimate the microlens centers from a white image, for example, with the method proposed in the reference 1. The estimated microlens centers can give the q-coordinates of the intersection of every tilted line with the horizontal axis: $\{q_i\,(p=0)\}$ in FIG. 3.

A first estimation method which can be used in the step S401 calculates the inherent shift on the microlens images. As it can be seen in FIG. 3, each in-focus spatial position is sampled by many microlenses, but with an inherent shift. More precisely, having n pixels under each microlens, each in-focus position is sampled by exactly $\lceil n/2 \rceil$ microlenses, where $\lceil . \rceil$ represents the ceiling function. For example, if the spatial position q=0 corresponds to an in-focus part of the scene, it is sampled by microlenses (ii), (iii) and (iv), i.e., the intensity of sample 6 of image (ii) is equal to the intensity of sample 4 of microimage (iii) and the intensity of sample 2 of microimage (iv).

Therefore, in this example, to get the samples corresponding to the in-focus parts of the scene, there is an inherent shift of 2 in the relative indices on the microlens images. The concept of disparity can then be addressed differently, depending on the demultiplexing step. In one embodiment demultiplexing is performed by simply extracting all the samples that correspond to a single p value (which is equivalent to horizontally slicing the phase-space diagram), and therefore a disparity estimation method finds a disparity equal to 2 for the in-focus pixels. In one embodiment, the demultiplexing step considers the inherent shift of the imaging system, and therefore the disparity of in-focus pixels is found equal to 0.

To calculate this inherent shift, let us formulate the sampling of the light field shown in FIG. 3. The slope of the tilted lines in FIGS. 2 and 3 is inversely proportional to the negative of distance a. The absolute spatial coordinate ($q_i$) of every sample for the angular coordinate p and sampled on microimage i can be then formulated as:

$$q_i(p) = -ap + aq_i(p=0) \qquad (1)$$

wherein a is the distance shown in FIG. 1, p is the target angular coordinate, and $q_i\,(p=0)$ is thespatial coordinate of the central pixel for the microlens image, which is the spatial coordinate for p=0.

Figure 5:
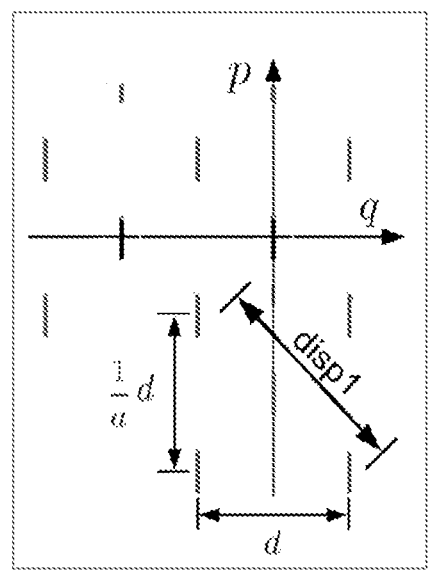
FIG. 5 illustrates a phase-space diagram showing the inherent shift of the in-focus pixels on the microlens images.

FIG. 5 illustrates a phase-space diagram showing the inherent shift of the in-focus pixels on the microlens images.

As shown in FIG. 5, the inherent shift of the in-focus pixels on the microlens images can be calculated from the Pythagorean theorem:

$$disp1 = d\frac{\sqrt{a^2+1}}{a} \qquad (2)$$

wherein a is the distance shown in FIG. 1, d is the aperture of microlens and disp1 is the inherent shift.

This inherent shift depends only on the physical configuration of the plenoptic camera, i.e., d (aperture of microlens)

and a (which itself depends only on b [the distance between microlens grid and sensor] and f [the focal length of the microlens]). Therefore, if microlens images for disparity estimation are used, the disparity values of the in-focus pixels on adjacent microlens images is estimated as very close to disp1. This is because in practice, the values of microlens diameter are not exactly the same due to manufacturing inaccuracies.

A second estimation method provides the inherent shift on the sub-aperture views. The inherent shift of the pixels on views with the angular distance of 2 is equal to d, the aperture of microlens. Please refer back to FIG. 3. On the view 1, pixel of microlens (ii) is the second sample on the view 1 from the left. Same spatial coordinate on the view 3 corresponds to the first sample of the view 3 from the left. The spacing between these samples is equal to d, so if we take the view 1 and the view 3, the same spatial coordinates that are in-focus have a distance d. This means that if the disparity estimation is performed on the sub-aperture views, the disparity values of the in-focus pixels is estimated very close to d. It can be appreciated that for the in-focus parts the inherent shift is theoretically equal to d. The inherent shift is the same as the disparity. The definition of the disparity is the shift of a pixel on two views. So any approach that estimates disparity from the sub-aperture views can give the inherent shift of the in-focus parts. It can be appreciated that for in-focus parts of the scene, the estimation is very close to d. This means that, if pixels of the views with this displacement have the same level of intensity (homogeneity), they belong either to the in-focus part, or to a homogeneous area.

In the step S401, the inherent shift of the plenoptic camera is estimated. This estimation can then allow a comparison of captured samples of each point of the scene in order to detect in-focus parts of the scene and to avoid estimating disparities for such pixels, which will be described below.

At step S402, a level of homogeneity of the pixels of the focused plenoptic data is determined. The homogeneity can be calculated using for example the standard deviation of the intensities of the corresponding pixels that are obtained by considering the inherent shift on the microlens images or the demultiplexed views of the light field if the inherent shift is not considered during the demultiplexing step. The standard deviations of images can be calculated separately on three color channels.

The raw data is usually captured through a Bayer color filter and the captured data are mosaicked. A Bayer filter mosaic is a color filter array for arranging RGB color filters on a square grid of photosensors, which is commonly used in most single-chip digital image sensors of digital cameras to create a color image. As a result, every sample of FIGS. 2, 3 and 5 contains the information in one color channel. To be able to evaluate the level of homogeneity of micro-lens images, we propose to treat the 3 color channels separately.

Using the micro-lens centers (that are estimated beforehand and are considered as inputs of our module as $\{q_i (p=0)\}$, the corresponding samples for every spatial position x are considered. The corresponding pixels are obtained by taking a vertical slice positioned at x from the phase-space representation of the light field—see FIG. 3. The corresponding pixel p on view i for the absolute coordinate x is therefore found through the following:

$$p = \frac{x - q_i(p=0)}{a}$$

3 color channels of the results are independently normalized in terms of energy. On every channel, the standard deviation of the normalized data is calculated and stored in the corresponding color channel of the output 3-channel vector (called the Standard vector for x).

At step S403, the pixels of the focused plenoptic data which either have disparities equal to the inherent shift or belong to homogeneous areas as a function of the level of homogeneity of pixels of the focused plenoptic data are determined.

In an example, the step S403 can be performed by thresholding the result of step S402 to obtain a binary mask, showing which pixel of the focused plenoptic data is estimated to either have a disparity equal to disp1 or belong to a homogeneous area which has the same intensity for the corresponding pixels.

Considering the fact that for every spatial position x, one to three standard deviations are estimated (depending on the available color samples for each spatial position x) to address the color channels separately, it is proposed to threshold these values simultaneously to merge the information into a single channel decision mask.

To do so, a threshold on the standard deviation is set for every channel. Next, for every spatial position x, if all the estimated standard deviations for the available color channels are less than the set thresholds, the output binary value at x is set to 0. Otherwise, the binary mask is set to 1.

The output of the step S403 provides an anticipation mask. Any disparity estimation algorithm can use this mask to estimate the depth of the focused plenoptic data discarding the disparity estimation for the determined pixels.

At step S404, the depth of the focused plenoptic data is estimated by a disparity estimation without considering the determined pixels. Based on the anticipation mask obtained in the step S403, the pixels of the focused plenoptic data which either have a disparity equal to the inherent shift or belong to a homogeneous area will not be considered for the estimation of the depth, which can reduce computational costs and at the same time increase accuracy of estimations for in-focus parts of the scene.

In can be appreciated that the disparity of one pixel is estimated by minimizing an aggregating cost function to reduce the impact of noise in the captured data. This cost function is calculated as a combination of local or global pixel disagreements, rather than single pixel disagreements. That is the reason why, in the second estimation method described above, the disparity estimation is performed on the extracted views, rather than the microlens images.

To be more specific, it shall be noted that the neighboring pixels on a microlens image correspond to different spatial positions of the scene. However, the spatial sampling of the light field is denser than its angular sampling. Therefore, most of the successful disparity estimation methods extract the views to benefit from the higher number of samples in spatial domain. Consequently, in the disparity estimation step, by extracting all the views, a matrix of views is reconstructed from plenoptic data. This matrix of views is next used to estimate depth of scene objects. More precisely, the displacement of every pixel on different views is estimated and is related to the depth of the corresponding object.

If a certain spatial position x corresponds to an in-focus part of the scene, all the samples with qi (p)=x, have the same intensity value. Otherwise, if the pixel position x corresponds to a homogeneous area of the scene, all the samples for qi (p)=x have the same intensity value, and the value of disparity cannot be estimated accurately, using local disparity estimation methods.

A priori, the disparity of the in-focus pixels is known (equal to d if the views are used). It is proposed to initialize the disparities of the homogenous areas to the values that correspond to the inherent shift of the pixels, i.e., either d or disp1 depending on the used images for disparity estimation (views or microlens images, respectively).

All the x positions for which the samples have the same intensity are marked and ignored during the disparity estimation step. Next, the inherent shift can be subtracted from the estimated disparity maps, to obtain a centered disparity map on the in-focus plane of the scene.

It shall be noted that the embodiment of the disclosure works if the vignetting of the camera is circumvented by any valid approach. The correction of vignetting can be done using different methods and the detail of vignetting correction is out of the focus of this disclosure.

It shall be noted that for a plenoptic camera like Raytrix, of which the microlenses are different from each other, the process of disparity estimation is much more complicated. A Raytrix camera has three types of microlenses with different focal length f values, which means there are 3 in-focus planes which provide higher depth of field. For disparity estimation, this difference in focal length should be considered, since the parts of the scene that are in-focus under one type of the microlens, are definitely out of focus under other 2 types of microlens. Therefore, the level of confidence on the estimated disparities is less than the confidence for a camera with the same number of pixels but only one type of microlens, since there are fewer samples corresponding to a certain focal plane.

Nevertheless, if during the intensity comparisons for all samples with qi (p)=x, we only consider the samples taken from the same type of microlens, positions that are in-focus for that certain in-focus plane of the scene can be anticipated.

Working on the microlens images, the anticipated disparities for every pixel is calculated similar to Equation 2, with respect to the relevant a (a is dependent on f and a fixed b). Working on views, the anticipated disparity is equal to d. It is therefore preferred to work on the views, reducing the number of problem dependencies. However, using the microlens images, the homogeneous areas can be distinguished from the in-focus planes, since the homogenous areas under different microlens focal planes are marked the same.

Figure 6:
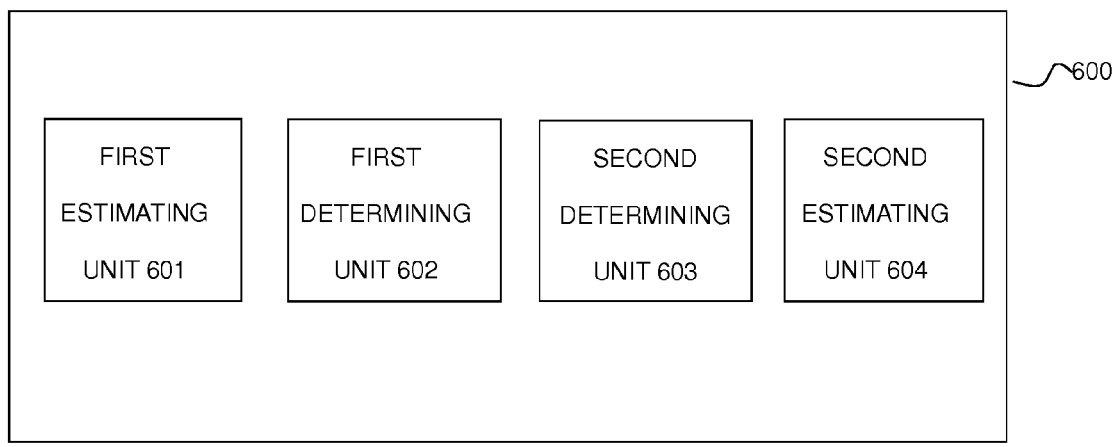
FIG. 6 is a block diagram of an apparatus for estimating the depth of focused plenoptic data according to an embodiment of the present disclosure.

FIG. 6 is a block diagram of an apparatus for estimating the depth of focused plenoptic data according to an embodiment of the present disclosure.

As shown in FIG. 6, the apparatus 600 for estimating the depth of focused plenoptic data comprises a first estimating unit 601 for estimating the inherent shift of in-focus pixels of the focused plenoptic data.

The apparatus 600 further comprises a first determining unit 602 for calculating a level of homogeneity of the pixels of the focused plenoptic data.

The apparatus 600 further comprises a second determining unit 603 for determining the pixels of the focused plenoptic data which either have disparities equal to the inherent shift or belong to homogeneous areas, as a function of the level of homogeneity of the pixels of the focused plenoptic data.

The apparatus 600 further comprises a second estimating unit 604 for estimating the depth of the focused plenoptic data by a disparity estimation without considering the determined pixels.

The apparatus 600 can be used for the post processing of focused plenoptic data captured by a plenoptic camera. For this purpose, the apparatus 600 can be embedded in the plenoptic camera or provided as a separate device.

It is to be understood that the present disclosure may be implemented in various forms of hardware, software, firmware, special purpose processors, or a combination thereof. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method for estimating disparity of raw focused plenoptic data, comprising:
    estimating an inherent shift of in-focus pixels of the raw focused plenoptic data, the inherent shift including a constant shift between samples of a same 3D point on different microlens images of the raw focused plenoptic data;
    determining a level of homogeneity of pixels of the raw focused plenoptic data;
    estimating a depth of the raw focused plenoptic data by a disparity estimation without considering the pixels of the raw focused plenoptic data which either have disparities equal to the inherent shift or which belong to homogeneous areas as a function of the level of homogeneity of the pixels of the raw focused plenoptic data.

2. The method according to claim 1, wherein the inherent shift is estimated as a function of a distance between a microlens grid of a camera capturing the raw focused plenoptic data and an in-focus plane of a main lens of the camera, an aperture and a focal length of microlens of the camera.

3. The method according to claim 1, wherein the estimation of the inherent shift comprises estimating a shift between samples of a same point on sub-aperture views of the raw focused plenoptic data.

4. The method according to claim 3, the inherent shift is estimated as a function of an aperture of microlens of a camera capturing the raw focused plenoptic data.

5. The method according to claim 1, wherein the level of the homogeneity of each pixel is determined by estimating a measure of homogeneity among all of its corresponding pixels, and assigning the estimated metric to all of the corresponding pixels.

6. The method according to claim 1, wherein the level of the homogeneity of each pixel is determined by calculating standard deviations among all of its corresponding pixels on three color channels, and assigning the estimated metric to all of the corresponding pixels.

7. The method according to claim 1, wherein the level of the homogeneity of each pixel is determined from a matrix of views of the raw focused plenoptic data to represent the light field of the views, by calculating a measure of homogeneity of the corresponding pixels of each pixel on the plurality of views in the matrix of views on three color channels.

8. The method according to claim 7, wherein the matrix of view is determined by:
  estimating from the raw focused plenoptic data a position of a center of each micro-lens of a plenoptic camera capturing unfocused plenoptic data; and
  demultiplexing for all angular coordinates the corresponding view of the unfocused plenoptic data by extracting from every microlens image the pixel at the spatial coordinate with respect to the center of every micro-lens image, and putting the extracted pixel in the view considering the inherent shift.

9. An apparatus for estimating disparity of raw focused plenoptic data, comprising:
  a first estimating unit configured to estimate the inherent shift of the raw focused plenoptic data;
  a first determining unit configured to determine a level of homogeneity of pixels of the raw focused plenoptic data;
  a second determining unit configured to determine the pixels of the raw focused plenoptic data which either have disparities equal to the inherent shift or belong to homogeneous areas, as a function of the level of homogeneity of the pixels of the raw focused plenoptic data; and
  a second estimating unit configured to estimate a depth of the raw focused plenoptic data by a disparity estimation without considering the determined pixels.

10. The apparatus according to claim 9, wherein the first estimating unit is configured to estimate the inherent shift by estimating a shift between samples of a same point on different microlens images of the raw focused plenoptic data.

11. The apparatus according to claim 10, wherein the first estimating unit is configured to estimate the inherent shift as a function of the distance between the microlens grid of a camera capturing the raw focused plenoptic data and an in-focus plane of a main lens of the camera, an aperture and a focal length of microlens of the camera.

12. The apparatus according to claim 10, wherein the first estimating unit is configured to estimate the inherent shift by estimating a shift between samples of a same point on sub-aperture views of the raw focused plenoptic data.

13. The apparatus according to claim 10, wherein the second determining unit is configured to determine the pixels of the raw focused plenoptic data which either have disparities equal to the inherent shift or belong to homogeneous areas by a thresholding the estimation homogeneity metric values which comprises:
  setting a threshold on the standard deviation for each color channel of an in-focus pixel;
  comparing the estimated homogeneity metric value per color channel with the threshold for that color channel; and outputting a value of 0 if the estimated homogeneity metric of the each color channel is less than the threshold, and
  outputting a value of 1 otherwise.

14. Computer program product which is stored on a non-transitory computer readable medium and comprises program code instructions executable by a processor for implementing the method according to claim 1.

* * * * *